United States Patent
Geagan et al.

(10) Patent No.: US 10,841,078 B2
(45) Date of Patent: Nov. 17, 2020

(54) ENCRYPTION KEY BLOCK GENERATION WITH BARRIER DESCRIPTORS

(71) Applicant: INTERNATIONAL BUSINESS MACHINES CORPORATION, Armonk, NY (US)

(72) Inventors: John B. Geagan, San Jose, CA (US); Dulce B. Ponceleon, Palo Alto, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 16/046,532

(22) Filed: Jul. 26, 2018

(65) Prior Publication Data
US 2020/0036513 A1    Jan. 30, 2020

(51) Int. Cl.
H04L 29/06      (2006.01)
H04L 9/06       (2006.01)
H04L 9/08       (2006.01)

(52) U.S. Cl.
CPC .......... H04L 9/0618 (2013.01); H04L 9/0877 (2013.01)

(58) Field of Classification Search
CPC ... H04L 9/0618; H04L 9/0877; H04L 9/0891; H04L 9/0861
See application file for complete search history.

(56) References Cited

U.S. PATENT DOCUMENTS

| | | | | |
|---|---|---|---|---|
| 7,340,603 B2* | 3/2008 | Asano | .................. | H04L 9/0836 380/278 |
| 7,774,598 B2* | 8/2010 | Chmora | ................ | H04L 9/0822 709/225 |
| 7,925,025 B2* | 4/2011 | Lotspiech | ............... | H04L 12/18 380/277 |
| 8,300,814 B2* | 10/2012 | Asano | ................... | H04L 9/0822 380/44 |
| 8,861,723 B2* | 10/2014 | Kambayashi | ......... | H04L 9/0897 380/44 |
| 9,252,948 B2* | 2/2016 | Rutkowski | ............ | H04L 9/0836 |
| 2003/0142826 A1 | 7/2003 | Asano | | |
| 2005/0195975 A1 | 9/2005 | Kawakita | | |
| 2006/0227975 A1 | 10/2006 | Ueda et al. | | |
| 2011/0191582 A1 | 8/2011 | Munger et al. | | |

OTHER PUBLICATIONS

Xingwen, Z. et al. (2012) "Tracing and revoking scheme for dynamic privileges against pirate rebroadcast."
Fangming, Z. et al. (2012) "Secure authenticated key exchange revocation for smart grid."
"Content Protection System with Media Key Block for Video-on-Demand" (Jun. 20, 2003).
"Including URL to Media Key Block in Encrypted Content Header." (Sep. 3, 2004).

* cited by examiner

*Primary Examiner* — Hosuk Song
(74) *Attorney, Agent, or Firm* — Erik Huestis; Stephen Kenny; Foley Hoag LLP (57) ABSTRACT

Encryption key block generation with barrier descriptors is provided. In some embodiments, a descriptor is read. The descriptor includes a list of revoked devices and a list of boundaries between devices. A plurality of subset differences is generated. The plurality of subset-differences covers a plurality of devices. None of the plurality of devices appears in the list of revoked devices. None of the plurality of subset differences spans any of the boundaries. Encrypted information is generated based on the subset differences.

20 Claims, 10 Drawing Sheets

ENCRYPTION KEY BLOCK GENERATION WITH BARRIER DESCRIPTORS

BACKGROUND

Embodiments of the present invention relate to encryption key block generation with barrier descriptors, and more specifically, to designating barriers between nodes of a subset-difference coverage tree across which subsets are not allowed to span.

BRIEF SUMMARY

According to one embodiment of the present invention, a method of and computer program product for encryption key block generation are provided. A descriptor is read. The descriptor includes a list of revoked devices and a list of boundaries between devices. A plurality of subset differences is generated. The plurality of subset-differences covers a plurality of devices. None of the plurality of devices appears in the list of revoked devices. None of the plurality of subset differences spans any of the boundaries. Encrypted information is generated based on the subset differences.

DETAILED DESCRIPTION

Content encryption in media devices allows manufacturers and other entities to limit access to media in storage devices to a particular group of approved media devices. One way to encrypt content is to provide keys to content receivers and to include an encryption key block in data or in a data storage device that is accessible by the content receivers. The keys are used by the receivers to transform data according to a predefined algorithm from encrypted data to de-encrypted data that may be used by the receiver.

When a media device is compromised, or when keys associated with the device are used by devices that were not originally provided with keys, and which were not intended to use the media content, a key management system revokes the compromised keys, preventing unauthorized use. One industry standard for providing and revoking keys is referred to as NNL (for Naor, Naor, and Lotspiech) or the subset-difference approach or method. The subset-difference method is described in "Revocation and Tracing Schemes for Stateless Receivers," by Dalit Naor, Moni Naor and Jeff Lotspiech, published Feb. 24, 2011.

In the subset-difference (S-D) method, a coverage tree is generated, representing each device that may be provided access to media and each of the keys associated with each device. The coverage tree includes a number of binary branches. In other words, the coverage tree includes nodes representing keys, and from each node two branches extend to sub-nodes, or nodes in a lower hierarchal level, until a base level (also referred to as "leaves"), where each node at the base level represents a device. Any device covered by the coverage tree includes keys to de-crypt the data to allow the device to access the content with which the coverage tree has been associated. In the S-D method, a node higher in the tree or in the hierarchy of nodes may derive the keys of nodes lower in the hierarchy, but nodes lower in the hierarchy may not derive keys of parent nodes, or nodes higher in the hierarchy. Therefore, in the S-D method, keys associated with a device may be revoked by designating as a key for encrypting data a key associated with a node that is a parent or predecessor of the device in the hierarchy of the coverage tree, or a key of the device itself (i.e., the leaf node). A subset-difference is determined by determining a subset of the tree that encompasses one revoked node or a block of sequential revoked nodes, and subtracting from the subset a node that would exclude the revoked nodes.

The information of the subset-difference coverage tree is used to generate a media key block (MKB) that is provided with media, such as data storage devices, that may be read by the media devices to allow the media devices to access content on the data storage devices. Conventionally, the subset-difference has been determined by selecting as the base subset from which one or more nodes, or keys, are revoked, the largest possible subset, or a subset covering the most-possible devices. Such a method of selecting the largest-possible subset as the basis for the subset-difference coverage results in a smallest-possible media key block supplied with each storage device. However, utilizing larger subsets makes it more difficult to forensically determine the source of an attacker, or a compromised key in the subset-difference coverage tree. Barriers can be used to define any partitioning of the nodes, providing flexibility regarding the configurations defined. For example, nodes representing resources can be grouped into specific geographies, or into priority groups for resource utilization. In addition, using barriers and revocations, a message may be sent to a specific target set of nodes.

Conventional methods of calculating a subset difference tree for generating media key blocks (MKBs) select as subsets a largest-possible subset. This results in a smallest-possible media key block to be included in a storage device but also makes identifying compromised keys more difficult. Embodiments of the present disclosure control an MKB generation device to select subsets of predetermined sizes by identifying boundaries or barriers in a subset-difference coverage tree across which subsets are not permitted to span.

Figure 1:
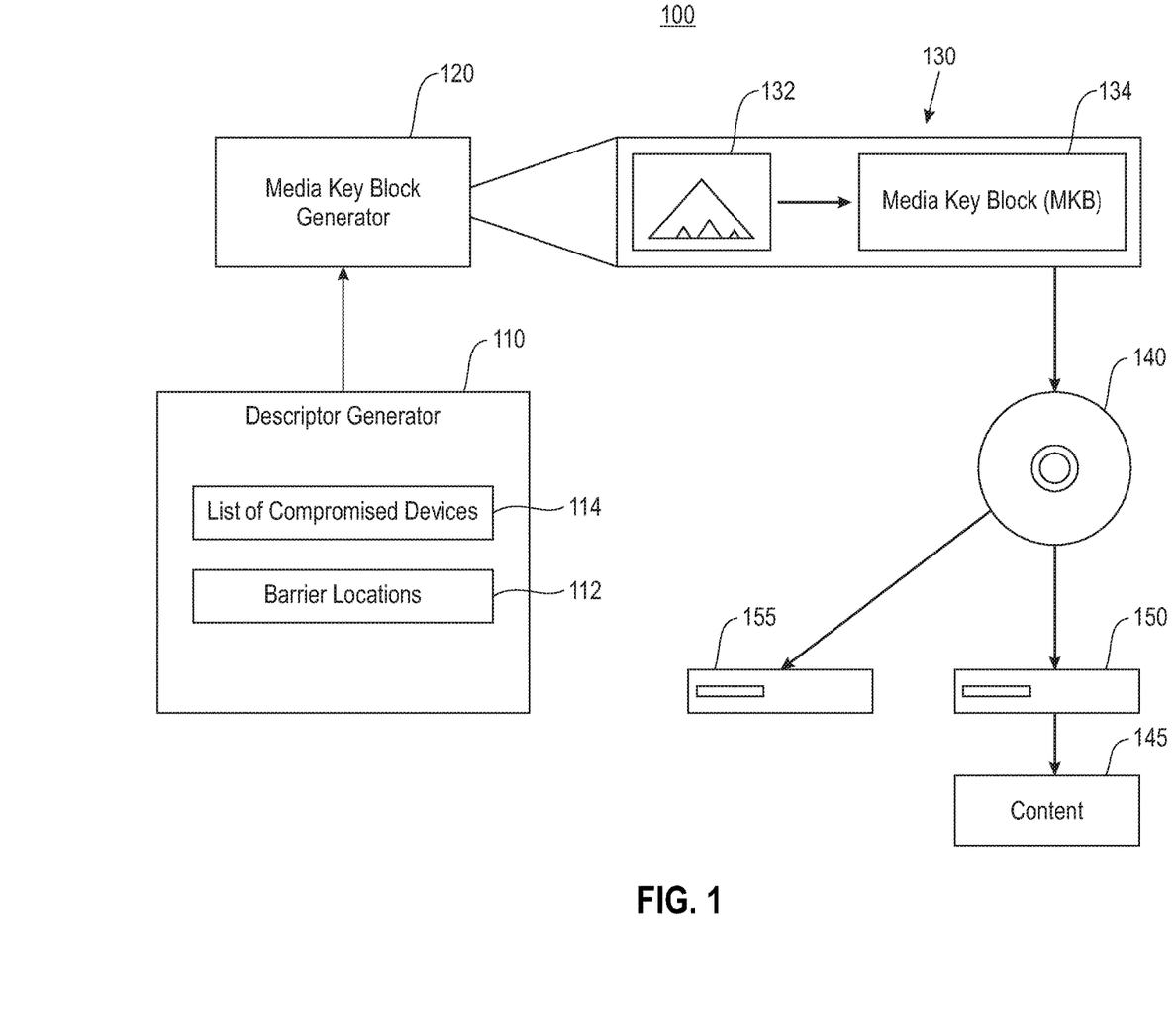
FIG. 1 illustrates a data encryption system according to embodiments of the present disclosure.

FIG. 1 illustrates an encryption system 100 according to an embodiment of the present disclosure. The encryption system 100 includes a descriptor generator 110 (also referred to in the specification and claims as a descriptor generating device 110) and an encryption key block generator 120, such as a media key block (MKB) generator 120. While FIG. 1 illustrates an MKB generator 120, embodiments of the present disclosure encompass any type of encryption key block generator for encrypting data. In some embodiments, the MKB generator 120 is a highly-secure device requiring multiple levels of security to change programming, such as data corresponding to media keys or media key blocks, in the media key block generator 120. For example, in one embodiment, changing programming of the media key block generator 120 requires physical witnesses and a video recording of the process. In one embodiment, the descriptor generator 110 is less secure than the MKB generator 120, permitting the changing of the pre-existing sets of encryption keys in a media system that are capable of decrypting the media key block without requiring reprogramming of the highly-secure MKB generator 120.

The descriptor generator 110 includes a list of compromised devices 114 and barrier locations 112. In the present description and claims, compromised devices may also be referred to as revoked devices or traitor devices. In the present description and claims, the barriers may also be referred to as boundaries, walls, firewalls and partitions. The list of compromised devices 114 and barrier locations 112 are provided to the MKB generator 120 in a descriptor. The MKB generator 120 generates a subset-difference (S-D) coverage tree covering all the non-compromised devices and omitting from coverage all the compromised devices. The MKB generator 120 then generates one or more media key blocks based on the S-D coverage tree. Window 130 of FIG. 1 represents the generation of the MKB generator 120 of the S-D coverage tree 132, and the MKB 134 based on the S-D coverage tree 132.

In one embodiment, the one or more media keys are stored in data storage devices 140, such as DVDs, Blu-ray DVDs, or other data storage devices. When the data storage devices 140 are connected to a covered media device 150 configured to read data from the data storage device, such as a DVD player, encryption keys stored in the media device may interact with the one or more media key blocks stored in the data storage device 140 to decrypt data in the data storage device 140 to permit the media device 150 to read content 145 from the data storage device 140.

On the other hand, when the data storage device 140 is connected to a revoked media device 155, the encryption keys of the revoked media device 155 are incapable of decrypting the data in the data storage device 140, preventing the revoked media device 155 from reading content from the data storage device 140.

While FIG. 1 illustrates the MKB generator 120 and the descriptor generator 110 as being physically separate devices, embodiments of the present disclosure encompass a single device including the functionality of both the MKB generator 120 and the descriptor generator 110. In addition, while FIG. 1 illustrates a disk as a data storage device 140 by way of example only, embodiments of the present disclosure encompass any data storage device separate from a media device, such as the media device 150. Embodiments of the present disclosure also encompass data storage devices that are part of the receiving media devices, such as a memory in a receiving media device capable of receiving a media key block from the media key block generator 120 by wired or wireless data transmission.

Figure 2:
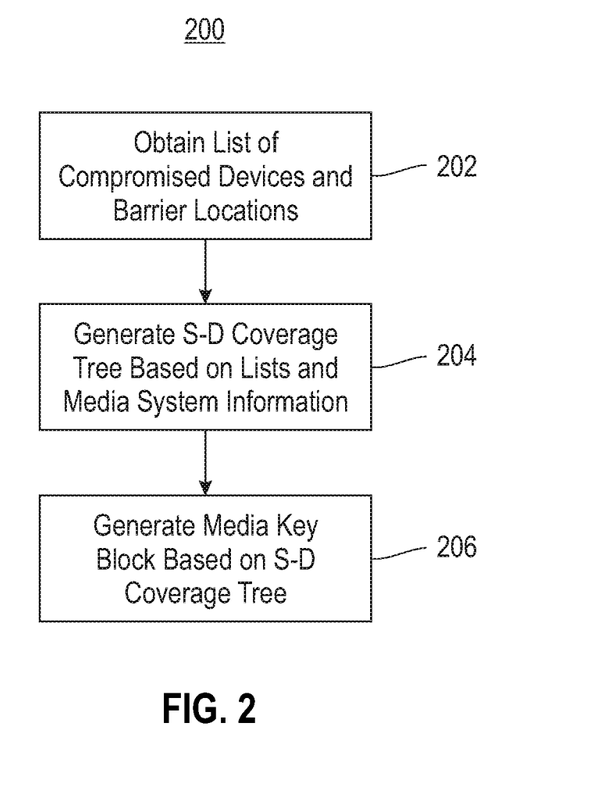
FIG. 2 illustrates a tree for data encryption according to embodiments of the present disclosure.

FIG. 2 illustrates a flow diagram of a method for generating a media key block according to an embodiment of the present disclosure. In block 202, a list of compromised devices and barrier locations is provide to a media key block (MKB) generator. The MKB generator has stored therein information about a media system, such as an encryption key tree listing every device in the media system at a base of the tree and binary hierarchal nodes ascending from the base of the tree to connect every device with a single node at the apex of the tree. The binary hierarchal node structure means each parent connects directly to only two children in a sub-tier of the tree.

In block 204, a subset-difference (S-D) coverage tree is generated based on the list of compromised devices, the list of barrier locations and the media system information. In particular, the barriers are inserted into the S-D coverage tree at predetermined locations, and subsets of the S-D coverage tree are not permitted to span the barriers.

In block 206, one or more media key blocks are generated based on the S-D coverage tree. The one or more media key blocks may be provided to storage media to be read and decoded by the media devices of the media system. In one embodiment, the one or more media key blocks are generated based on S-D values of nodes corresponding to the peaks of subsets minus revoked devices in the subsets within the S-D coverage tree.

Figure 3:
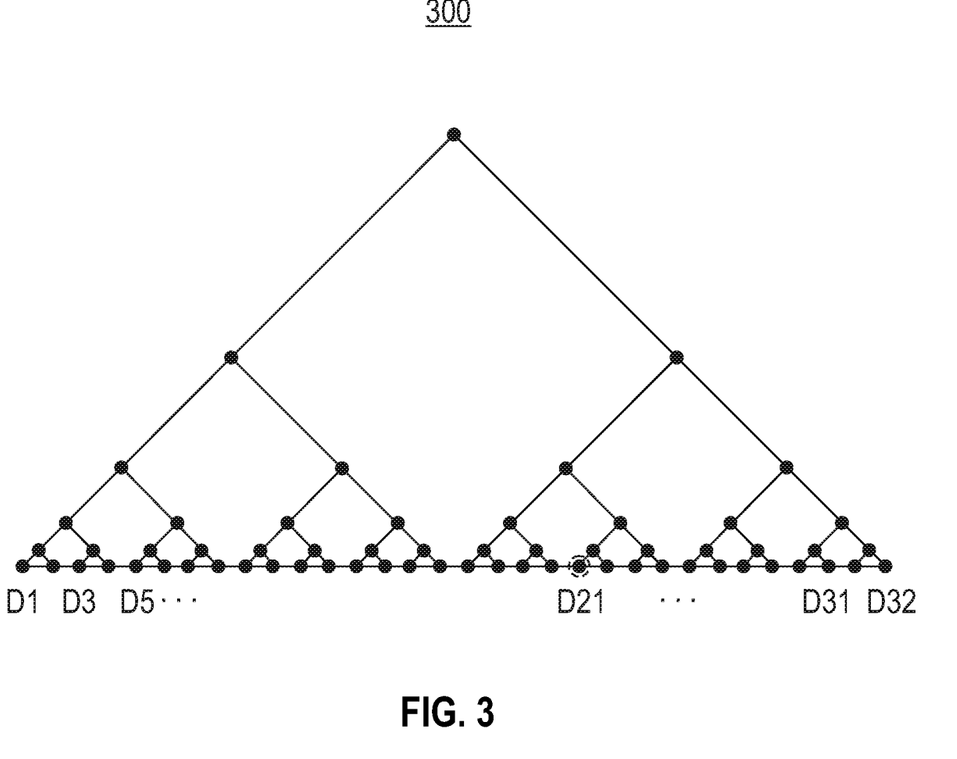
FIG. 3 illustrates a flow diagram of a method for generating a media key block according to embodiments of the present disclosure.

FIG. 3 illustrates an encryption key tree 300, where each node, represented by a dot on the tree, represents an encryption key. The base of the tree 300 includes nodes D1 to D32 representing devices, and each node corresponding to devices D1 to D32 also includes an associated unique key. The base nodes D1 to D32 may also be referred to as leaves of the tree. Although FIG. 3 illustrates a tree including 32 devices by way of example, embodiments of the present disclosure encompass trees of any size, and a typical tree of a media system may include millions, billions, trillions of devices, etc.

Figure 4:
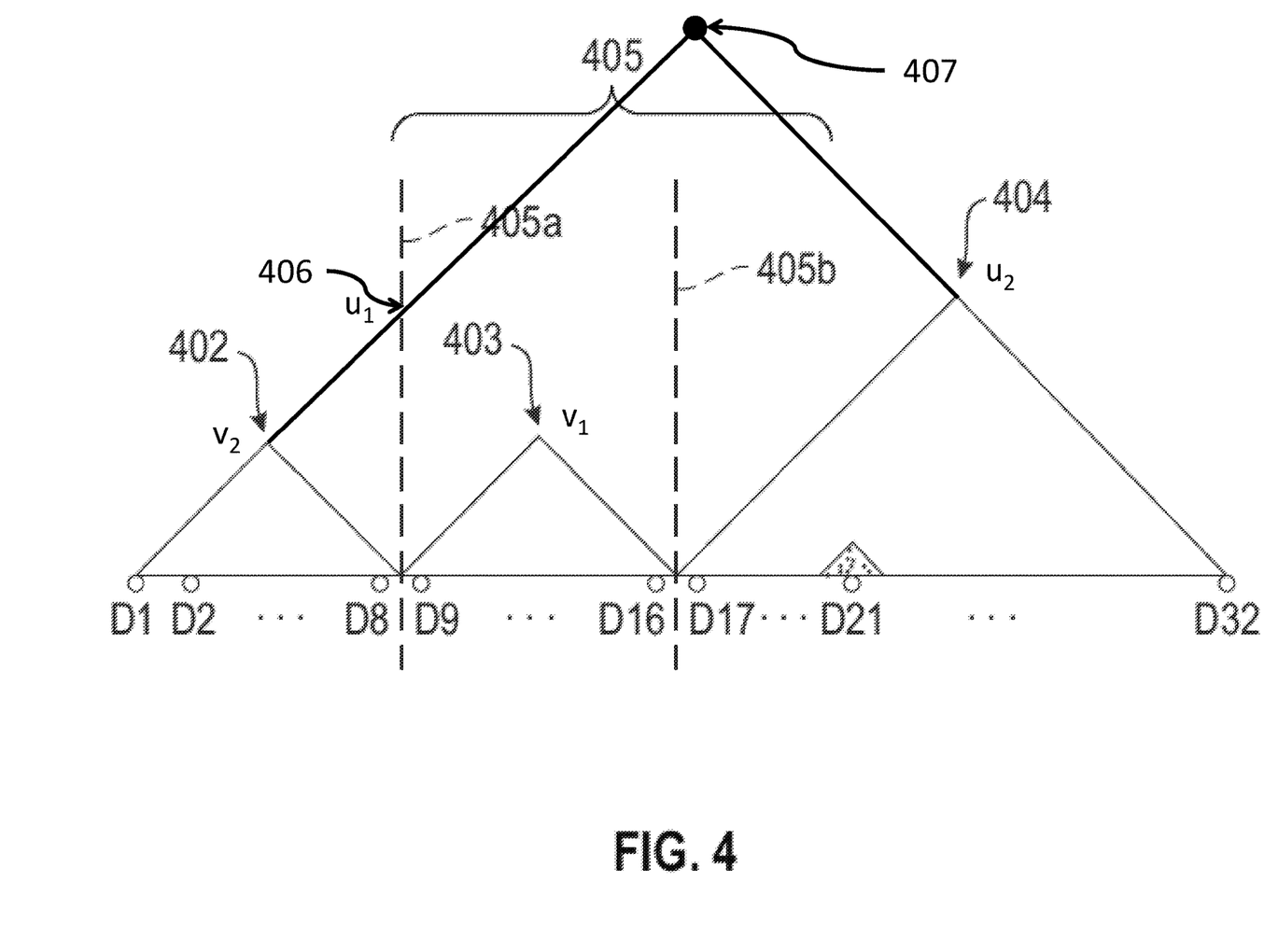
FIG. 4 illustrates a subset-difference coverage tree according to embodiments of the present disclosure.

In FIG. 3, a device D21 has been identified as a compromised device, or a device whose key has been used or identified by unauthorized users or devices. Accordingly, the device D21 may be placed on a list of compromised devices 114 in the descriptor generator 110 of FIG. 1. FIG. 4 illustrates a subset-difference (S-D) coverage tree 400 according to an embodiment of the present disclosure. As illustrated in FIG. 4, the descriptor generator 110 of FIG. 1 may generate a descriptor defining barriers 405, such as the two barriers 405a and 405b of FIG. 4. These barriers 405 are defined as points along the base between two adjacent devices (such as device D8 and device D9, as well as device D16 and device D17) across which subsets are not permitted to span. In other words, while a method to generate an S-D coverage tree resulting in a smallest-possible media key block (such as in FIG. 3) could result in one subset covering all the non-revoked devices, embodiments of the present disclosure provide a means to control the media key block generator 120 to generate subsets of at least a predetermined size smaller than a largest-possible size for covering all non-revoked devices. Barriers are not necessarily placed between power-of-2 subtrees, and instead can be defined between any two nodes. Accordingly, as illustrated in FIG. 4, the barriers 405a and 405b result in the generation of three subsets 402 ($u_1$-$v_1$), 403 ($u_1$-$v_2$) and 404 ($u_2$-D21) to cover all the non-revoked devices D1-D20 and D22-D32. One or more media key blocks may be generated and included in a data storage device based on the S-D values of the subsets 402, 403 and 404. In particular, nodes D1 ... D8 are covered by ($u_1$-$v_1$); nodes D9 ... D16 are covered by ($u_1$-$v_2$); nodes D17-D32 except D21 are covered by ($u_2$-D21). Methods that that only focus on generating minimal-size MKB would calculate a single subtree 407-D21, where 407 is the root of the tree. This minimal MKB covers only non-revoked nodes but it violates constraints imposed by barriers 405.

Figure 5A:
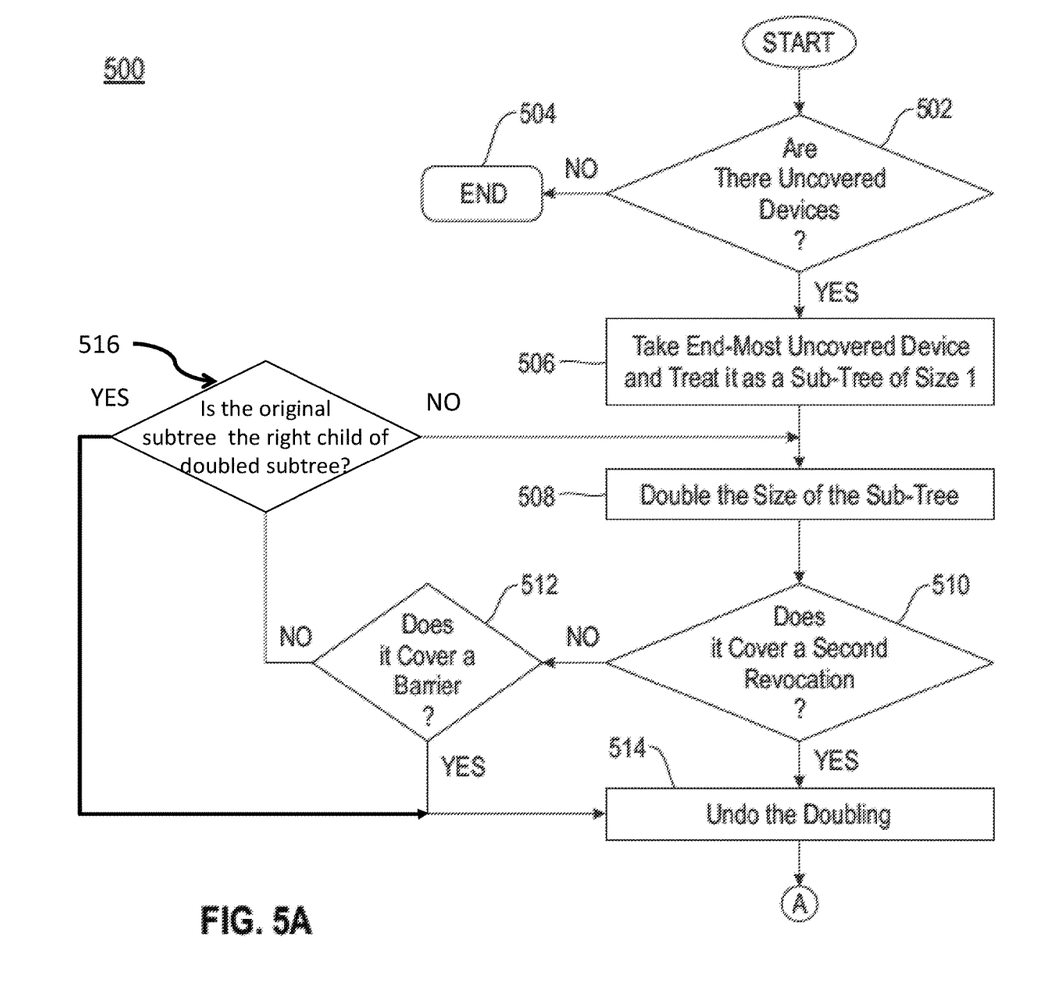
FIGS. 5A-B depict a flow diagram for generating a subset-difference coverage tree according to embodiments of the present disclosure.
Figure 5B:
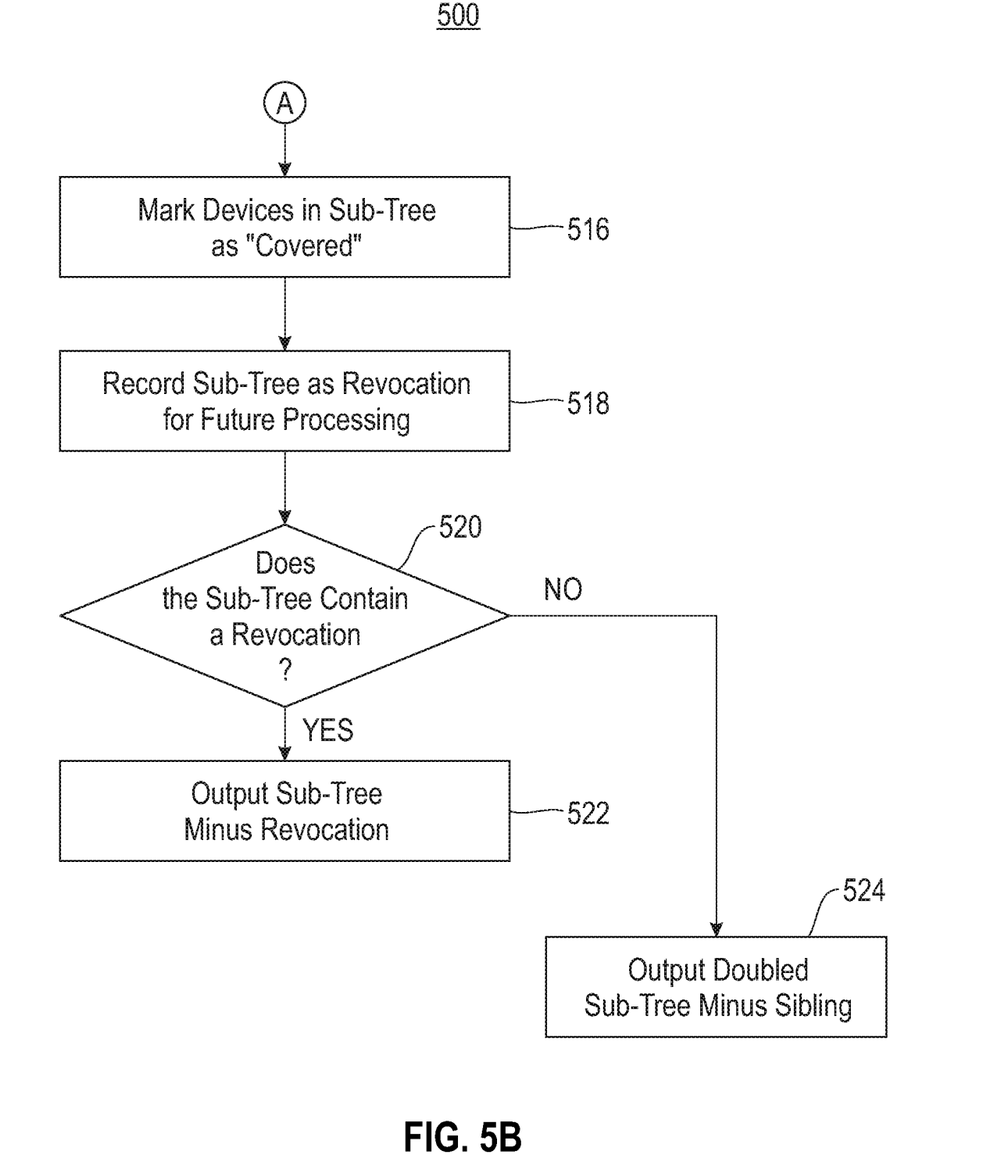

FIGS. 5A and 5B illustrate a method of generating a subset-difference coverage tree according to embodiments of the present disclosure. In one embodiment, the process of generating the subset-difference coverage tree is performed by a media key block generator 120, as illustrated in FIG. 1. In block 502 it is determined if any uncovered devices exist in an encryption key tree. If not, the process ends in block 504. If uncovered devices exist, an end-most uncovered device is selected in block 506 and treated as a sub-tree of size one (1). In block 508, a size of the sub-tree is doubled (e.g., doubling the subtree rooted at 404 to arrive at the subtree rooted at 407). In this context, doubling the size of a sub-tree A, refers to selecting the sub-tree rooted at the parent node of sub-tree-A. The doubled sub-tree thus is one level higher than sub-tree A, and consequently has twice as many nodes as sub-tree-A.

In block 510, it is determined whether the doubled sub-tree covers a second revocation. In one embodiment (illustrated in FIG. 6), the second revocation is defined as a second (or at least two) revoked devices. In another embodiment (illustrated in FIG. 7), the second revocation corresponds to at least two separate groups of revoked devices, where each group includes sequential revoked devices with no covered devices between the revoked devices. For a sequence of revoked nodes to be considered (or treated) as a group, the number of nodes in the sequence must be a power of two. If it is determined in block 510 that the sub-tree does not cover a second revocation, then it is determined in block 512 if the sub-tree covers a barrier (e.g., detecting barriers 405a and 405b under subtree 407), then it is determined in block 516 if the original sub-tree is the right child of the doubled sub-tree. If not, then the process repeats in block 508 with the sub-tree again being doubled.

On the other hand, if it is determined in block 510 that the sub-tree covers a second revocation, then the doubling of the sub-tree is undone in block 514. If it is determined in block 512 that the sub-tree covers a barrier, then the doubling of the sub-tree is undone in block 514 (e.g., arriving back at the subtree rooted at 404). If it is determined in block 516 that the original sub-tree is the right child of the doubled sub-tree, then the doubling of the sub-tree is undone in block 514. Accordingly, the size of the sub-tree is increased to a maximum-possible size that does not cover a barrier and does not cover a second revocation (a sub-tree with the maximum potential power-of-2 number of nodes). If the doubling process attempts to define a sub-tree that would include non-existent nodes, that is, nodes to the left of the left-most defined node or to the right of the right-most defined node, such non-existent nodes are treated as revoked. In short, the region outside the range of defined nodes is considered as a revoked region.

In block 516, the devices in the sub-tree are designated "covered." In block 518, the sub-tree is designated as being "revoked" for purposes of future processing only (i.e., for purposes of generating further sub-trees, while the devices are covered in the generation of a media key block based on the final S-D coverage tree).

In block 520, it is determined whether the sub-tree contains a revocation (e.g., node D21 under subtree 404). In one embodiment, the revocation corresponds to a revoked device, and in another embodiment, the revocation corresponds to a group of sequential revoked devices having no covered devices between the revoked devices. If the sub-tree contains a revocation, then the sub-tree is labeled with a subset-difference (S-D) value of the value of the sub-tree minus the value of the revocation at 522 (e.g., $u_4$-D21). On the other hand, if it is determined that the sub-tree contains no revocation, the sub-tree is labeled with an S-D value of the doubled sub-tree minus the sibling of the non-doubled sub-tree at 524. In other words, where a parent node is designated as tier 1 in an encryption tree hierarchy, the parent node connects to two children nodes designated as tier 2, the children nodes being siblings to each other. In embodiments of the present disclosure, when one of the children nodes of tier 2 represents a sub-tree having no revoked devices, the S-D value is the subset value of the parent node minus the subset value of the sibling of the sub-tree.

Figure 6:
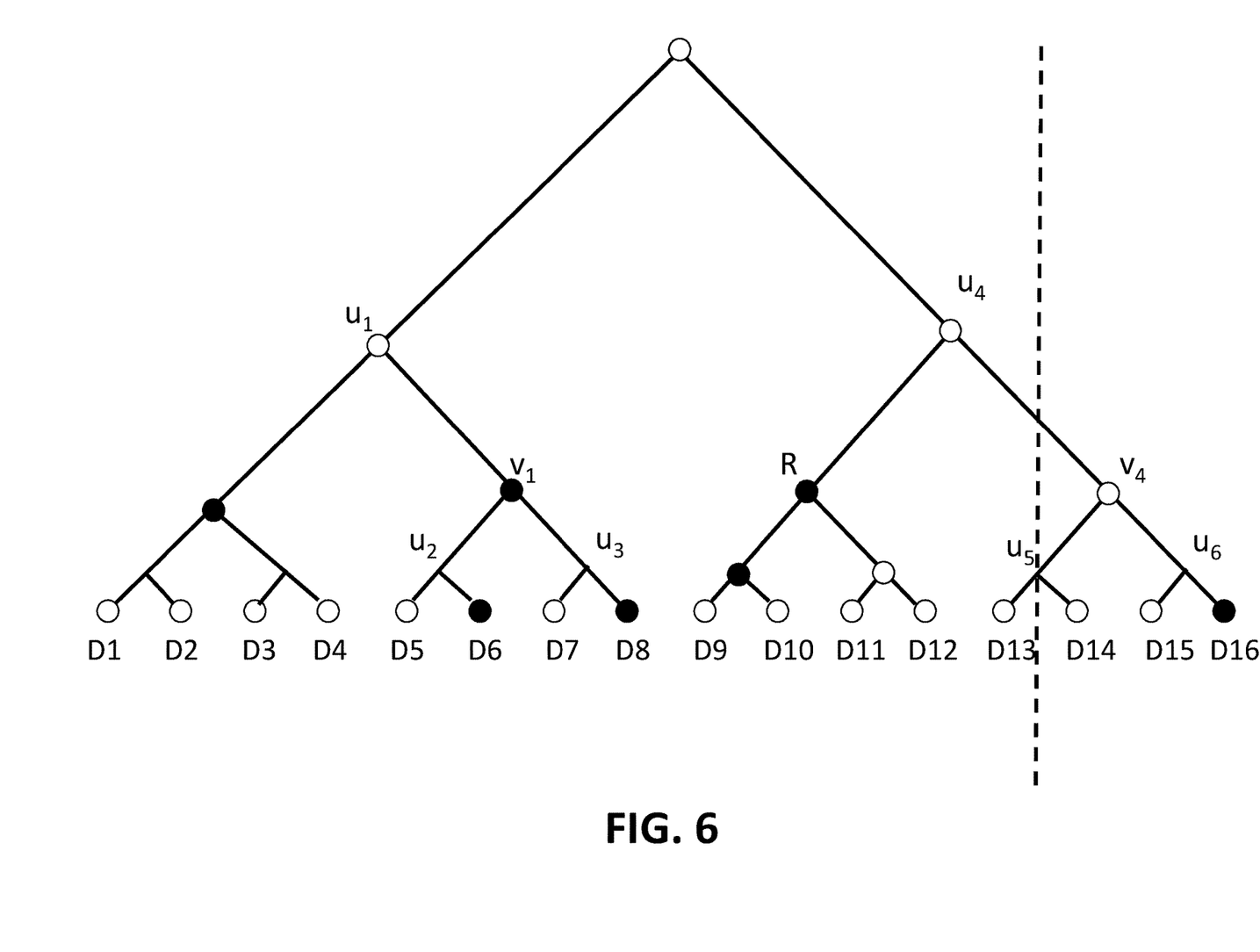
FIG. 6 illustrates an exemplary subset-difference coverage tree according to embodiments of the present disclosure.

Referring now to FIG. 6, an exemplary subset-difference coverage tree according to embodiments of the present disclosure is illustrated. In this example, the subtree rooted at $v_1$ has single-node revocations (D6, D8, and D16). Accordingly, in this example, nodes D1 . . . D4 are covered by ($u_1$-$v_1$); node D5 is covered by ($u_2$-D6); node D7 is covered by ($u_3$-D8); nodes D9 . . . D12 are covered by ($u_4$-$v_4$); node D13 is covered by ($u_5$-D14); node D14 is covered by ($u_5$-D13); node D15 is covered by ($u_6$-D16). In this example, the barrier defines separation at a non-power-of-two boundary.

Figure 7:
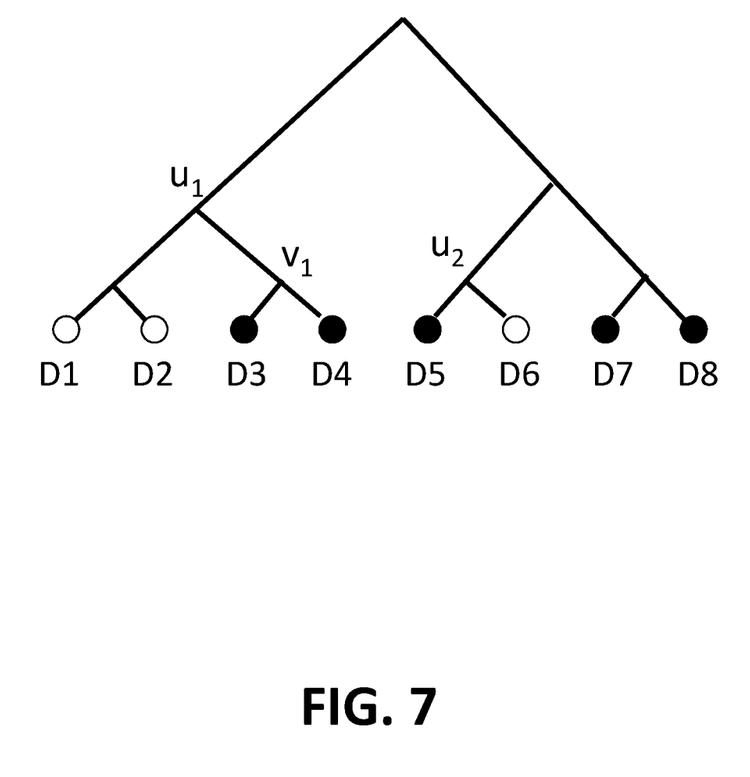
FIG. 7 illustrates an exemplary subset-difference coverage tree according to embodiments of the present disclosure.

Referring now to FIG. 7, an exemplary subset-difference coverage tree according to embodiments of the present disclosure is illustrated. In this example, there is a sequence of revoked devices. Nodes D1 . . . D2 are covered by ($u_1$-$v_1$); node D6 is covered by ($u_2$-D5).

Figure 8:
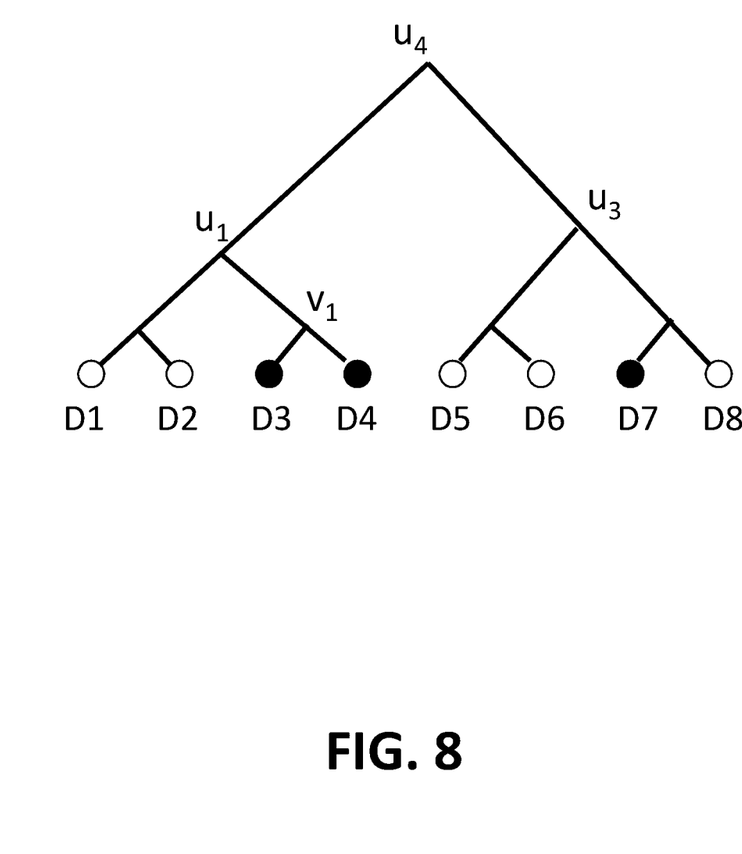
FIG. 8 illustrates an exemplary subset-difference coverage tree according to embodiments of the present disclosure.

Referring now to FIG. 8, an exemplary subset-difference coverage tree according to embodiments of the present disclosure is illustrated. Nodes D1 . . . D2 are covered by ($u_1$-$v_1$); nodes D5, D6, and D8 are covered by ($u_4$-D7).

Figure 9:
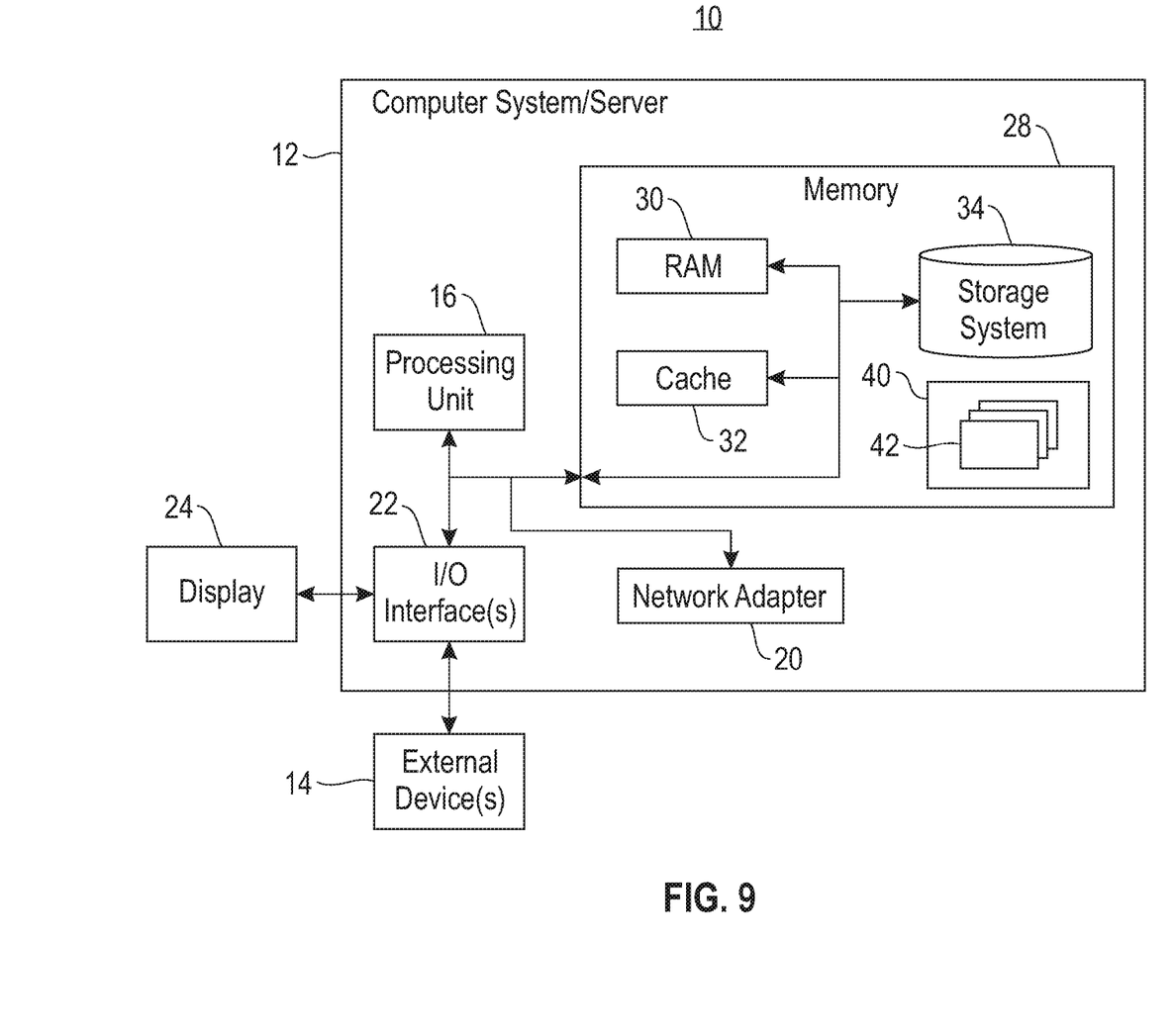
FIG. 9 depicts a computing node according to an embodiment of the present disclosure.

Referring now to FIG. 9, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a descriptor, the descriptor comprising a list of revoked devices and a list of boundaries between devices;
generating a plurality of subset differences, the plurality of subset differences covering a plurality of devices, none of the plurality of devices appearing in the list of revoked devices, and none of the plurality of subset differences spanning any of the boundaries,
wherein generating the subset differences comprises
identifying an uncovered device, the uncovered device not appearing in the list of revoked device,
generating a first subtree, the first subtree covering the uncovered device, and
including the first subtree in the subset differences; and
generating encrypted information based on the subset differences.

2. The method of claim 1, wherein the encrypted information comprises an encryption key block.

3. The method of claim 2, comprising:
encrypting content using the encryption key block.

4. The method of claim 2, comprising:
encrypting a plurality of content items, each of the plurality of content items being encrypted according to one of the subset differences.

5. The method of claim 1, wherein the encrypted information comprises a message.

6. The method of claim 1, wherein generating the subset differences comprises:
doubling the first subtree so long as it: (i) does not cover any of the devices appearing in the list of revoked devices and (ii) does not span any of the boundaries.

7. The method of claim 1, wherein:
the first subtree covers the uncovered device and is the maximal subtree that does not cover any of the devices appearing the list of revoked devices and does not span any of the boundaries.

8. A computer program product for generating an encryption key block, the computer program product comprising a computer readable storage medium having a descriptor embodied therewith, the descriptor comprising a list of revoked devices and a list of boundaries between devices, the descriptor readable by an encryption key block generator to cause the encryption key block generator to perform a method comprising:
reading a descriptor, the descriptor comprising a list of revoked devices and a list of boundaries between devices;
generating a plurality of subset differences, the plurality of subset-differences covering a plurality of devices, none of the plurality of devices appearing in the list of revoked devices, and none of the plurality of subset differences spanning any of the boundaries,
wherein generating the subset differences comprises
identifying an uncovered device, the uncovered device not appearing in the list of revoked device,
generating a first subtree, the first subtree covering the uncovered device, and
including the first subtree in the subset differences; and generating encrypted information based on the subset differences.

9. The computer program product of claim 8, wherein the encrypted information comprises an encryption key block.

10. The computer program product of claim 9, the method comprising:
encrypting content using the encryption key block.

11. The computer program product of claim 9, the method comprising:
encrypting a plurality of content items, each of the plurality of content items being encrypted according to one of the subset differences.

12. The computer program product of claim 8, wherein the encrypted information comprises a message.

13. The computer program product of claim 8, wherein generating the subset differences comprises:
doubling the first subtree so long as it: (i) does not cover any of the devices appearing in the list of revoked devices and (ii) does not span any of the boundaries.

14. The computer program product of claim 8, wherein:
the first subtree covers the uncovered device and is the maximal subtree that does not cover any of the devices appearing the list of revoked devices and does not span any of the boundaries.

15. A system comprising:
a descriptor generator having stored therein a list of revoked devices and a list of boundaries between devices; and
an encryption key block generator receiving from the descriptor generator a descriptor comprising the list of revoked devices and the list of boundaries between devices, the encryption key block generator generating a plurality of subset differences, the plurality of subset differences covering a plurality of devices, none of the plurality of devices appearing in the list of revoked devices, and none of the plurality of subset differences spanning any of the boundaries,
wherein generating the subset differences comprises
identifying an uncovered device, the uncovered device not appearing in the list of revoked device,
generating a first subtree, the first subtree covering the uncovered device, and
including the first subtree in the subset differences.

16. The system of claim 15, wherein generating the subset differences comprises:
doubling the first subtree so long as it does not cover any of the devices appearing the list of revoked devices and so long as it does not span any of the boundaries.

17. The system of claim 15, wherein:
the first subtree covers the uncovered device and is the maximal subtree that does not cover any of the devices appearing the list of revoked devices and does not span any of the boundaries.

18. The system of claim 15, further comprising:
an encryptor generating encrypted information based on the subset differences.

19. The system of claim 18, wherein the encrypted information comprises an encryption key block.

20. A method comprising:
reading a descriptor, the descriptor comprising a list of revoked devices and a list of boundaries between devices;
determining a plurality of subset differences, the plurality of subset differences covering a plurality of devices, none of the plurality of devices appearing in the list of revoked devices, and none of the plurality of subset differences spanning any of the boundaries,
wherein the subset differences were determined by
identifying an uncovered device, the uncovered device not appearing in the list of revoked device,
generating a first subtree, the first subtree covering the uncovered device, and
including the first subtree in the subset differences;
generating an encryption key block based on the subset differences; and
storing the encryption key bock in a computer readable storage medium, the computer readable storage medium comprising content decryptable using the encryption key block.

* * * * *